Mar. 13, 1923.

O. A. COLBY

ELECTRIC PERCOLATOR

Filed Apr. 18, 1922

1,448,389

WITNESSES:
R. J. Butler.
H. M. Biebel

INVENTOR
Ora A. Colby.
BY
Wesley G. Carr
ATTORNEY

Patented Mar. 13, 1923.

1,448,389

UNITED STATES PATENT OFFICE.

ORA A. COLBY, OF IRWIN, PENNSYLVANIA, ASSIGNOR TO WESTINGHOUSE ELECTRIC & MANUFACTURING COMPANY, A CORPORATION OF PENNSYLVANIA.

ELECTRIC PERCOLATOR.

Application filed April 13, 1922. Serial No. 555,282.

*To all whom it may concern:*

Be it known that I, ORA A. COLBY, a citizen of the United States, and a resident of Irwin, in the county of Westmoreland and State of Pennsylvania, have invented a new and useful Improvement in Electric Percolators, of which the following is a specification.

My invention relates to electric fluid heaters and particularly to electrically heated percolators and it has for one of its objects to provide a relatively simple construction for an electrically heated percolator comprising ceramic or vitreous material.

Another object of my invention is to provide an electrically heated percolator of ceramic or vitreous material which shall permit of quickly removing and replacing the heating element.

In practising my invention, I provide an outer casing and an inner container having operative engagement with each other at their rim portions only. A removable cover member carries the material holder. The inner container comprises a depending tubular portion constituting a vaporizing chamber for the percolator and a radiant electric heating element surrounds and is supported by the depending portion. An aperture in the bottom of the outer casing is normally closed by a heat-insulating member having an integral portion surrounding the heating element to reduce the amount of heat radiated outwardly therefrom.

In the single sheet of drawings.

Figure 1:
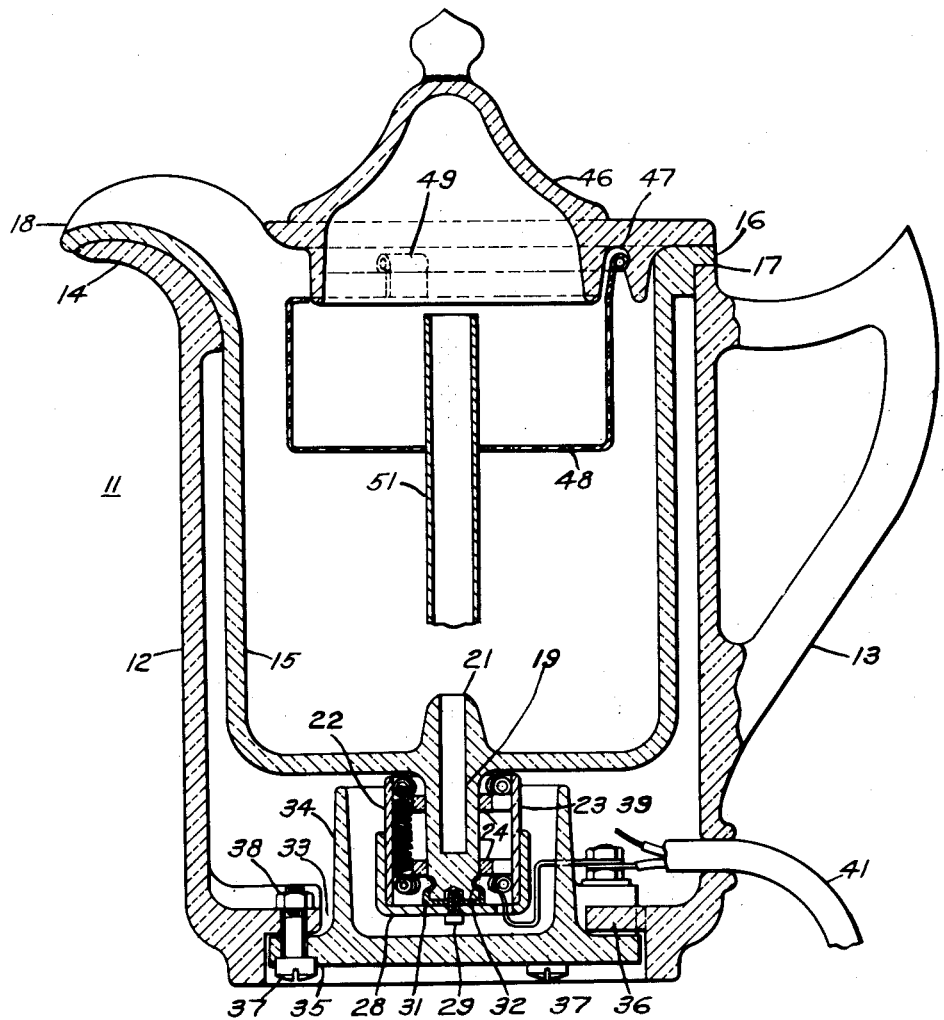
Figure 1 is a view, in vertical section, of an electric percolator embodying my invention.
Figure 2:
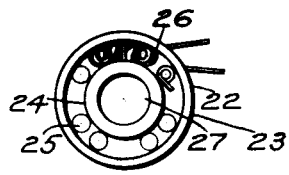
Fig. 2 is a top plan view of a heating element constituting a part of the device embodying my invention.

An electric percolator, designated generally by the numeral 11 comprises an outer casing 12 of any suitable ceramic or vitreous material having a handle member 13 either integral therewith or suitably secured thereto and a pouring spout-portion 14, of any suitable or desired form. The inner fluid container 15, of relatively less outer diameter than the outer casing 12, has an integral radially extending flange portion 16 at its upper end of such dimensions and form as to permit of the inner container resting on and being supported by the upper edge of the outer casing 12. Any suitable means may be employed to secure the outer casing and the inner container in proper operative positions relatively to each other, such as a suitable cement, indicated by the numeral 17. The inner container 15 is provided with a spout portion 18 which fits into and co-operates with the spout portion 14 of the outer casing. The inner container 15 is provided with a depending tubular portion 19 having a substantially central vertically extending chamber 21 therein to constitute a vaporizing chamber for the percolator.

An electric heating element 22 surrounds the depending tubular member 19 and comprises a relatively thin-wall cylindrical portion 23, within which are two inwardly radially extending spaced-apart flanges 24, each of which is provided with a plurality of substantially circular openings 25 therethrough, the openings in the top and bottom flanges registering with each other. An electric resistor 26 comprises a suitable resistance wire which may be wound in helical form and threaded through the openings 25 in the upper and lower radial flanges 24, substantially as illustrated in Fig. 1 of the drawing, to provide a radiant heater. The flanges 24 are each provided with a central circular opening 27 therethrough, of such dimensions as to cause them to fit closely around the tubular portion 19 to substantially center the heating element 22 on the vaporizing chamber.

In order to maintain the heating element in its proper operative position surrounding the depending tubular portion, I provide a cup-shaped metallic member 28 engaging the bottom and a portion of the outer surface of the refractory supporting member 23 and hold the same against the tubular member 19 by a small screw 29, which engages a metallic spring clip 31, which is also of substantially cup shape, with an inwardly extending spring portion which operatively engages a substantially circumferential groove 32 adjacent the lower end of the tubular member 19. This construction permits of removing the heating element after the screw 29 has been taken out, the retaining member 28 and the heating element being removable from the device as a unit.

The outer casing 12 is provided, at its bottom, with a substantially central and circular opening 33 which is normally closed by a heat-insulating member 34 of cup-shape. The heat-insulating member 34 is provided with an outwardly extending flange 35 which normally engages an inwardly projecting flange portion 36 of the bottom of the outer casing 12 against which it may be secured by a plurality of bolts 37 and nuts 38 which may be molded in place adjacent the inner face of the flange portion 36. Any other suitable locking or securing means may, however, be employed. Terminal members 39 may be mounted on a portion of the member 34 to which the ends of the resistor wire 26 may be brought and to which also the ends of a suitable supply-circuit conductor 41 may be connected. While I have illustrated a plurality of nuts threaded on a bolt, any suitable or desired construction of contact terminal members may be employed.

Figure 3:
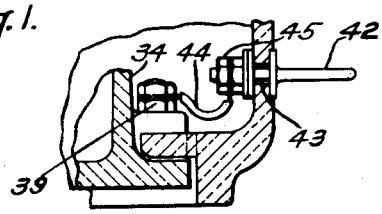
Fig. 3 is a fragmentary view, in vertical section, of a modified form of contact terminal employed in the device embodying my invention.

The construction of terminal members illustrated in Fig. 1 of the drawing does not permit of normally removing the supply-circuit-conductor cord and, if desired, the construction illustrated in Fig. 3 of the drawing may be employed, in which a plurality of contact terminal pins 42 may be mounted in a portion of the casing 12 adjacent the bottom thereof and extending through suitable openings 43, additional conductors 44 being employed to connect the contact terminal members 39 to the terminal pins 42, nuts 45 being employed thereon in the usual manner.

A removable cover member 46 of a suitable and pleasing design, fitting upon the inner container 15, is so shaped as to have an annular groove 47 in its inner surface. A container 48 of the usual foraminous construction is provided to hold the ground coffee to be placed therein and may be provided, at its upper edge, with a plurality of spring members 49 so shaped as to permit of their normally operatively engaging the annular groove 47 to support the container 48 in its proper operative position within the inner container 15. A fountain tube 51 may be suitably secured within the container 42 and be provided, at its lower end, with a suitable pump mechanism (not shown) to permit of co-operating with the vaporizing chamber 21 to effect the usual percolating operation. As any desired construction of pump may be used and, as this forms no part of my invention, it will not be illustrated or further described.

The device embodying my invention provides a double-wall heat-insulated percolator device of vitreous or ceramic material and an electric heating element which may be quickly removed from, or placed in its proper operative position engaging, the vaporizing chamber of the percolator. I provide also a heating element so constructed as to radiate substantially all of its heat directly against the tubular member constituting the vaporizing chamber, thus resulting in quick operation of the device and the combined means for closing the bottom of the outer casing and for reducing the amount of heat radiated from the outer surface of the heating element. The construction of the cover member co-operating with the middle holder to maintain the latter in its proper operative position provides a relatively simple construction permitting of removing the material container quickly and easily whenever required.

Various modifications may be made in the device embodying my invention without departing from the spirit and scope thereof and I desire that only such limitations shall be placed thereon as are imposed by the prior art or are specifically set forth in the appended claims.

I claim as my invention:

1. In a percolator, an outer casing, an inner fluid container comprising an integral depending tubular portion constituting a vaporizing chamber, said inner container having its sides and bottom spaced apart from the outer casing and having an integral rim operatively engaging the top of the outer casing, and a heating element surrounding and operatively supported by said tubular portion.

2. In a percolator, a vitreous or ceramic outer casing, a vitreous or ceramic inner fluid container spaced apart at its sides and bottom from the outer casing and having an integral depending tubular extension constituting a vaporizing chamber, and a radiant heating element surrounding and operatively supported by said tubular extension.

3. In a percolator, in combination, an outer ceramic vitreous casing, an inner ceramic or vitreous fluid container having an integral depending tubular portion constituting a vaporizing chamber, said inner container and outer casing having operative engagement at only their top edges, a cover member operatively supported by the top edge of the inner container and a material container releasably supported by said cover member.

4. In an electrically heated percolator, in combination, an outer ceramic or vitreous casing having an opening in the bottom thereof, an inner ceramic or vitreous fluid container, a tubular member depending from said inner container and constituting a vaporizing chamber, an electric heating element supported by said tubular member, and a heat-insulating member for closing the opening in the bottom of the outer casing and for reducing the amount of heat radiated from the outside of the heating element.

5. In an electrically heated percolator, in combination, an outer ceramic or vitreous casing having an opening in the bottom thereof, an inner ceramic or vitreous fluid container, a tubular member depending from said inner container and constituting a vaporizing chamber, a metal cap resiliently mounted on said tubular member, an electric heating element surrounding said tubular member and means secured to said metal cap for holding said heating element in its proper operative position.

6. In an electrically heated percolator, in combination, an outer ceramic or vitreous casing having an opening in the bottom thereof, an inner ceramic or vitreous fluid container, a tubular member depending from said inner container and constituting a vaporizing chamber, a metal cap resiliently mounted on said tubular member, an electric heating element surrounding said tubular member, means secured to said metal cap for holding said heating element in its proper operative position, and a heat-insulating member for closing the opening in the bottom of the outer casing.

7. In an electrically heated percolator, in combination, an outer casing of ceramic or vitreous material having an aperture in the bottom thereof, an inner ceramic or vitreous fluid container having an integral depending tubular portion constituting a vaporizing chamber, an electric heating element supported by and removable from said tubular portion, and a single means for closing the aperture in said outer casing and for reducing the amount of heat radiated from the outside of the heating element.

8. In an electrically heated percolator, in combination, an outer casing of ceramic or vitreous material having an aperture in the bottom thereof, an inner ceramic or vitreous fluid container having an integral depending tubular portion constituting a vaporizing chamber, an electric heating element supported by and removable from said tubular portion, a single means for closing the aperture in said outer casing and for reducing the amount of heat radiated from the outside of the heating element, and terminal members for said heating element mounted on said aperture-closing means.

In testimony whereof, I have hereunto subscribed my name this 17th day of April, 1922.

ORA A. COLBY.